J. W. WALTERS.
FLEXIBLE SHAFT COUPLING.
APPLICATION FILED DEC. 15, 1908.

956,912.

Patented May 3, 1910.

Inventor
Julius W. Walters

Witnesses

By

Attorneys

UNITED STATES PATENT OFFICE.

JULIUS WM. WALTERS, OF GLENS FALLS, NEW YORK, ASSIGNOR TO MECHANICAL DEVICES COMPANY, OF ALBANY, NEW YORK, A CORPORATION OF NEW YORK.

FLEXIBLE SHAFT-COUPLING.

956,912.   Specification of Letters Patent.   Patented May 3, 1910.

Application filed December 15, 1908. Serial No. 467,631.

*To all whom it may concern:*

Be it known that I, JULIUS W. WALTERS, a citizen of the United States, residing at Glens Falls, in the county of Warren and State of New York, have invented new and useful Improvements in Flexible Shaft-Couplings, of which the following is a specification.

My invention relates to flexible shaft couplings by means of which two shafts not in alinement may be operatively connected.

The invention is especially designed for use in coupling the motor and propeller shafts in motor boats, but it is, of course, equally applicable to coupling the drive shafts of motor vehicles, lines of shafting in shops, etc.

The object of the invention is to provide a coupling so constructed that it will serve to operatively connect not only shafts disposed at an angle to each other, but also shafts offset laterally one from another, and lying in different planes.

Figure 1:
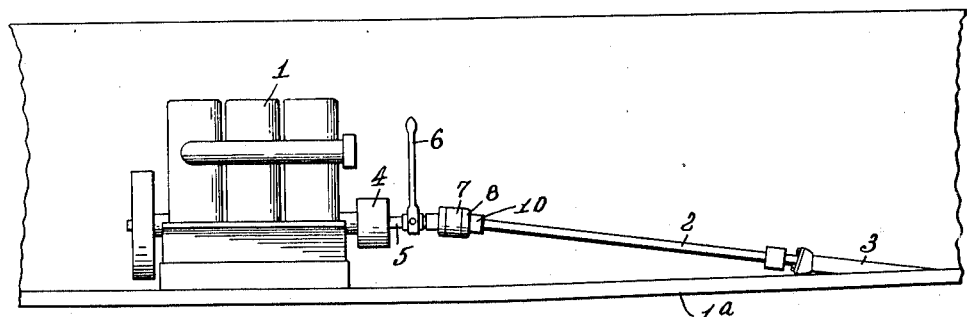
Figure 2:
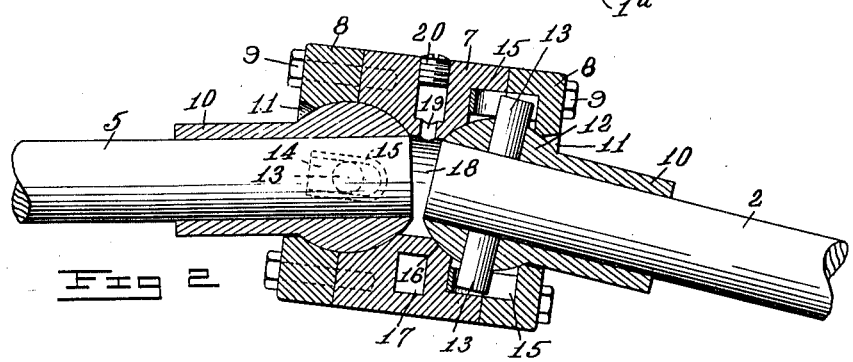
Figure 3:
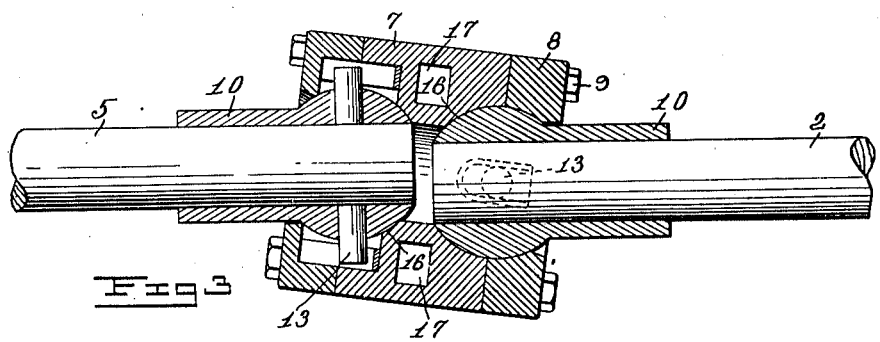

With the above, and other minor objects in view, and to improve generally upon the details of such devices, my invention consists in the construction and arrangement of parts hereinafter described, and illustrated in the accompanying drawings, in which;

Figure 1 is a fragmentary side elevation of the interior of a boat showing my invention as applied to the propeller shaft thereof. Fig. 2 is a central, vertical, longitudinal section on an enlarged scale through my improved shaft coupling. Fig. 3 is a similar section on a plane at right angles to that of Fig. 2.

Referring to the drawings in detail, 1 designates a motor suitable for marine propulsion, and 2 indicates the propeller shaft. This shaft passes, as is usual, through a suitable bearing 3 mounted in the bottom 1ᵃ of the boat.

4 indicates the usual clutch, 5 the usual shaft extending therefrom, and 6 the controlling lever.

In motor boat construction, it is highly desirable that the motor itself should be set with its shaft horizontal, or approximately so, and since the propeller shaft is necessarily inclined to the keel, it follows that with such an arrangement, the motor shaft and propeller shaft are at an angle to one another. These shafts not only lie at an angle to one another in the same plane, but it quite frequently happens that the two shafts will fall in different planes entirely, that is there will be a lateral displacement of one relative to the other. This results from the difficulty of accurately alining the shafts and bringing them into exactly the same vertical plane. As will be hereinafter explained, my improved coupling permits of considerable variation or lateral displacement between the shafts, and thus renders it unnecessary to endeavor to bring the shafts into accurate transverse alinement.

Referring more particularly to Figs. 2 and 3, it will be seen that my improved coupling comprises a casing, preferably cylindrical, consisting of a body-portion 7, at each end of which is an annular plate or ring 8 secured thereto, as by bolts 9. Spherical seats or sockets 16 are formed in each end of the casing, and lie partly within the body-portion, and partly within the end-plates, and within such spherical sockets fit ball members 12. These ball-members have hubs or sleeves 10 projecting therefrom, and extending through apertures 11 formed in the end-plates. The shafts, as 2 and 5, are fitted into openings in these ball-members and hubs, and may be secured thereto by any suitable means.

Flexible joints of this nature, as ordinarily constructed, are subject to rapid deterioration on account of undue friction, and wear of the parts. In order to prevent wear of the ball members and sockets in the present construction, I provide pins 13, preferably of hardened steel, which are set into the ball-members at right angles to the shaft, and project beyond the periphery of the ball-members so as to form pintles or pivots. It will, of course, be noted that the pins in the two ball-members extend substantially at right angles to each other, as well as to the shaft.

On each side of each shaft, the casing is provided with slots 14, formed partly in the body portion, and partly in the end-plates and adapted to receive the ends of the pivot pins 13. In order to prevent wearing of the casing adjacent these slots, I arrange in each of said slots a U-shaped wear plate 15, preferably of steel, so disposed as to embrace the ends of the pins 13. It will thus be seen that the entire thrust of the transmission is taken up by the pins 13 bearing against the wear plates 15, and hence the wearing away of the softer metal of the casing itself, or of the ball-members, is prevented.

In order to further diminish the wear of the parts, and to reduce friction to a minimum, I provide means for lubricating the interior of the casing and ball seats. To this end I form an annular chamber 17 in the body portion of the casing, so disposed as to surround the space 18 between the adjoining ends of the two shafts to be coupled, and connect the chamber with such space by means of ports 19. Suitable lubricant may be fed into the chamber 17 through an opening normally closed by a screw-plug 20, as clearly shown in Fig. 2.

In Fig. 3, the offset or lateral displacement between the two shafts is clearly shown. It will be noted that owing to the sliding movement of the pins in the slots 14, as well as the pivotal movement of the ball-members about the pins 13 as centers, each shaft end has practically a flexible movement relative to the casing. In other words my improved coupling comprises two flexible joints placed end to end. Owing to this great flexibility, I am enabled to connect the two shafts not only under the conditions shown in Fig. 2 or Fig. 3, taken separately, but also when these two conditions occur at the same time, as is frequently the case in motor boat equipment.

It will thus be seen that I have provided a flexible shaft coupling of very simple and durable construction, and which is adapted to a large variety of uses, and it is therefore thought that the numerous advantages of my invention will be readily appreciated by those skilled in the art.

The coupling is of very simple construction composed of few parts; the pins 13 serve efficiently for transmission, the slots 14 in which they are disposed permitting shafts sustaining angular relations to be efficiently coupled and power transmitted from one to the other, and said pins serve also as pivots so that shafts which not only sustain angular relations to each other but are offset laterally from one another may be efficiently coupled for the transmission of power, for example, as illustrated in Fig. 3 of the drawing.

What I claim is:—

A flexible coupling for shafts comprising a body portion having its opposite sides provided with spherical seats, each seat having a recess extending within the body portion on diametrically opposite sides of the seat, said recesses having their outer walls in parallelism with the axis of the body portion, independent ball members arranged in said seats, end plates secured to said body portion for confining the ball members, each plate having recesses complemental to the recesses of the body portion to provide an elongated recess, U-shaped wear plates located within the recesses, and pivot pins projecting from the ball members and having their projecting ends positioned in said recesses within the wear plates, the portion of the recesses within the said wear plates being of a length to permit free movements of the pins in the direction of length of the recesses.

In testimony whereof I have hereunto set my hand in presence of two subscribing witnesses.

JULIUS WM. WALTERS.

Witnesses:
MAUDE L. AUSTIN,
DWIGHT W. WAIT.